E. CHAMBERLIN.

Devices for Clamping Whip-Sockets to Vehicles.

No. 5,699. Reissued Dec. 23, 1873.

WITNESSES:
R. C. Dieterich.
C. H. Watson

INVENTOR,
Edwin Chamberlin
per
J. H. Alexander & Co.
ATTORNEYS.

AM. PHOTO-LITHOGRAPHIC CO. N.Y. (OSBORNE'S PROCESS.)

UNITED STATES PATENT OFFICE.

EDWIN CHAMBERLIN, OF LANSINGBURG, ASSIGNOR, BY MESNE ASSIGNMENTS, TO HIMSELF AND JOHN O. MERRIAM, OF TROY, NEW YORK.

IMPROVEMENT IN DEVICES FOR CLAMPING WHIP-SOCKETS TO VEHICLES.

Specification forming part of Letters Patent No. 43,896, dated August 23, 1864; reissue No. 2,387, dated November 6, 1866; reissue No. 4,787, dated March 5, 1872; reissue No. 5,699, dated December 23, 1873; application filed October 15, 1873.

DIVISION B.

*To all whom it may concern:*

Be it known that I, EDWIN CHAMBERLIN, of Lansingburg, county of Rensselaer and State of New York, have invented certain new and useful Improvements in Whip-Sockets, the object of which is to furnish a fastening device, by which means the socket is securely fastened to the vehicle without the use of bolts, buckles, or screws, and consists in providing a device so constructed that the action of pressing the socket into the device the same is caused to clasp and hold the socket and that part of the vehicle to which the same is secured, as hereinafter more fully described; and I do hereby declare that the following is a full, clear, and exact description thereof, which will enable others skilled in the art to which it appertains to make and use the same, reference being had to the accompanying drawing, with letters of reference marked thereon, forming a part of this specification, in which—

Figure 1:
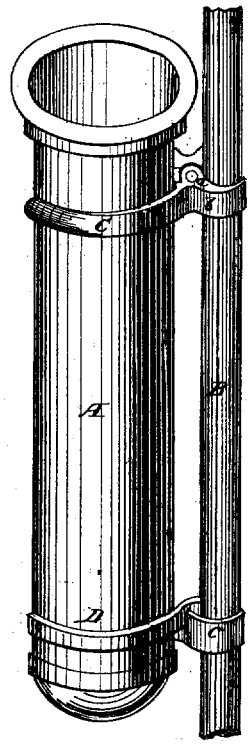
Figure 2:
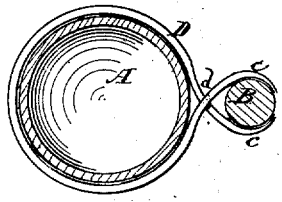
Figure 3:
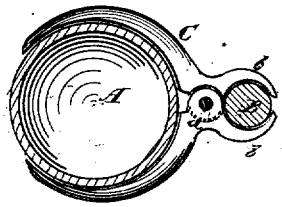

Figure 1 represents a side elevation of a device embodying my invention. Fig. 2 represents a section of a socket, showing the fastener constructed in one piece; and Fig. 3 represents the fastener in two pieces pivoted between the socket and dash-rail.

A represents a socket of any suitable construction, and B the dash-rail or other part of the vehicle, to which the socket is to be attached. C represents the clamp embracing the socket on one side and pivoted at *a*, and formed in jaws *b b*, which embrace the dash-rail B. It will be observed that by placing the jaws *b b* around the dash-rail, and then inserting the socket in the other part, as shown in Fig. 1, and pressing the socket tightly therein, the parts embracing the socket will be thrown outward, bringing the jaws *b b* tightly around the dash-rail, and thus the socket is secured in position.

Another form of this invention is represented by Fig. 2, D representing the fastening device constructed in one piece, the larger portion embracing the socket A, the ends crossing each other at *d* and formed into jaws *c c*, which embrace the dash-rail B. This acts upon the same principle as the other, and its use and operation are the same. By this means a simple, convenient, and efficient fastening device is constructed, by which any ordinary form of socket can readily be attached to a vehicle without the use of a bolt, screw, or equivalent device.

Having thus fully described my invention, what I claim, and desire to secure by Letters Patent, is—

In combination with a whip-socket, a clamp for securing the socket to the vehicle, said clamp being constructed to grasp the dash-rail and socket, in the manner and for the purpose specified.

In testimony whereof I have hereunto set my hand in presence of two witnesses.

EDWIN CHAMBERLIN.

Witnesses:
C. H. WATSON,
ANSON SEARLS.